United States Patent [19]

Sekendur

[11] Patent Number: 5,477,012
[45] Date of Patent: Dec. 19, 1995

[54] OPTICAL POSITION DETERMINATION

[76] Inventor: Oral F. Sekendur, 399 W. Fullerton Pkwy., #15W, Chicago, Ill. 60614

[21] Appl. No.: 862,977

[22] Filed: Apr. 3, 1992

[51] Int. Cl.⁶ .................................................. G08C 21/00
[52] U.S. Cl. .................................... 178/18; 345/179
[58] Field of Search ................... 178/18, 19; 340/710, 340/709; 341/5, 23, 13; 253/456; 345/179, 180, 181, 182

[56] References Cited

U.S. PATENT DOCUMENTS

| | | | |
|---|---|---|---|
| 4,572,952 | 2/1986 | March | 341/13 X |
| 4,712,100 | 12/1987 | Tsunekuni et al. | 178/18 |
| 5,051,736 | 9/1991 | Bennett et al. | 345/180 |
| 5,075,558 | 12/1991 | Nakagawa | 250/556 |
| 5,086,197 | 2/1992 | Liou | 178/18 |
| 5,128,526 | 7/1992 | Yoshida | 235/456 |
| 5,128,528 | 7/1992 | Heninger | 235/456 |
| 5,214,426 | 5/1993 | Minohara et al. | 341/13 |

OTHER PUBLICATIONS

DataSweep 2, Specification Sheet, Soricon Corp., Jul. 6, 1992.

*Primary Examiner*—Stephen Chin
*Assistant Examiner*—Paul Loomis

[57] ABSTRACT

This invention relates to a coordinate sensor for detecting the position of a moveable detector relative to a data space coded with coordinate information by detecting and processing the coordinate information. It may be used for obtaining both two and three dimensional position related information, such as might be used for determining the position of a pen/pencil on paper for handwriting data input. It also may be used for detecting angular, rotational, and linear motion. The coordinate sensor provides an apparatus for precisely locating the position of a movable element within a space. More particularly, it provides an input/output apparatus for use with a computer that includes a movable element, whose exact position within a space can be determined without any physical connection between the movable element and the space. It comprises a data space formatted with a code for designating the coordinates of a point in the data space, a detector for detecting the code, a processor for processing data from the detector to determine the position of the point in the data space, and a data output method for human interface to the coordinate sensor.

18 Claims, 4 Drawing Sheets

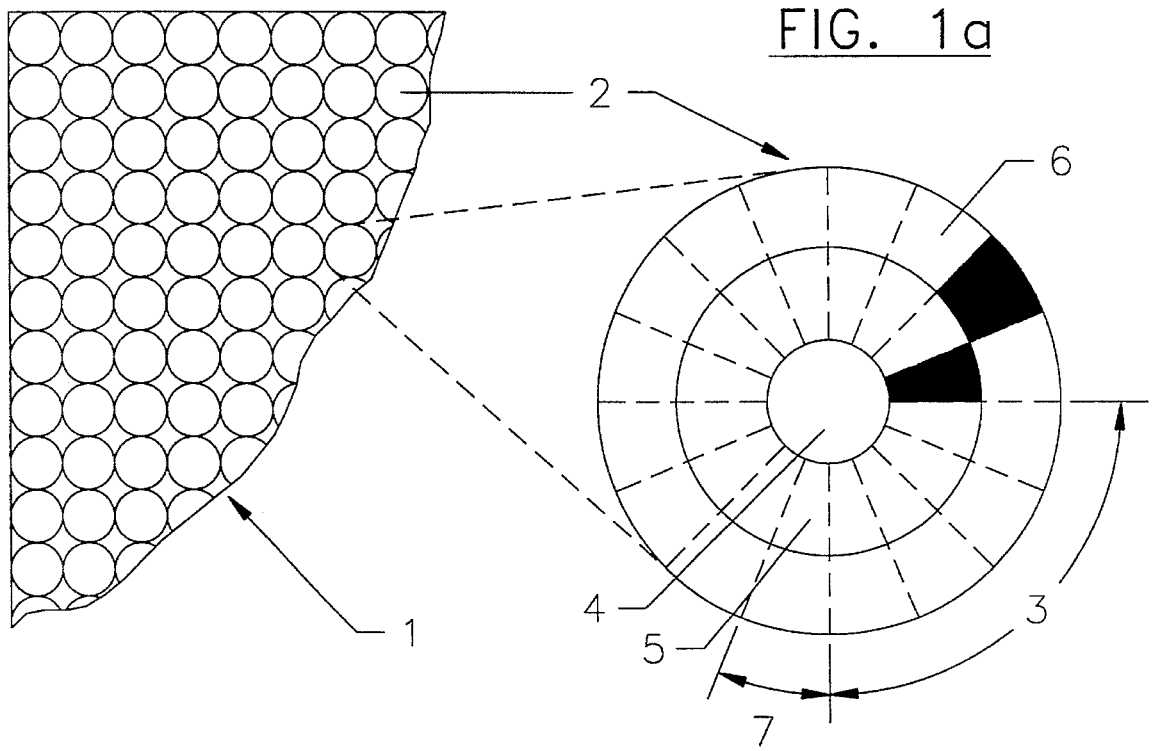
FIG. 1
FIG. 1a
FIG. 2
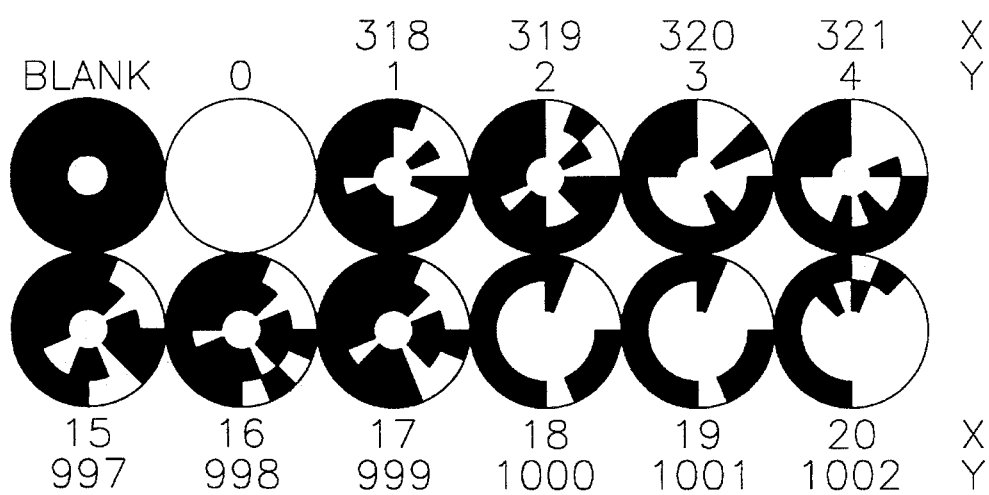

FIG. 3
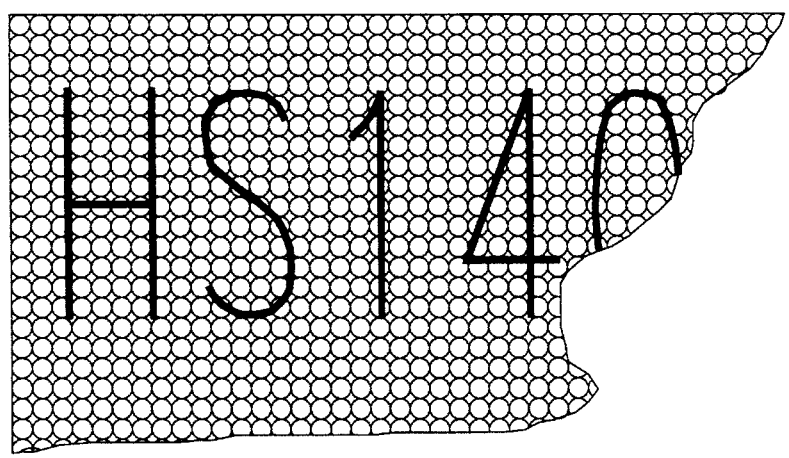
FIG. 4
FIG. 4a
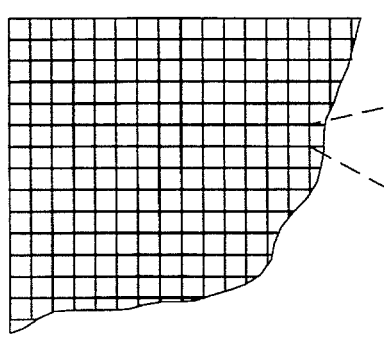
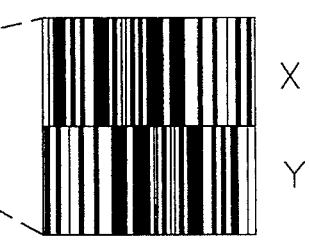
FIG. 5a
FIG. 5
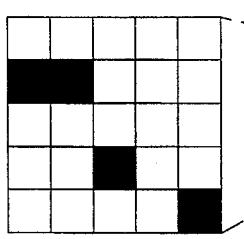
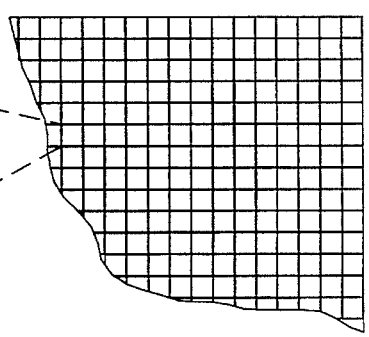

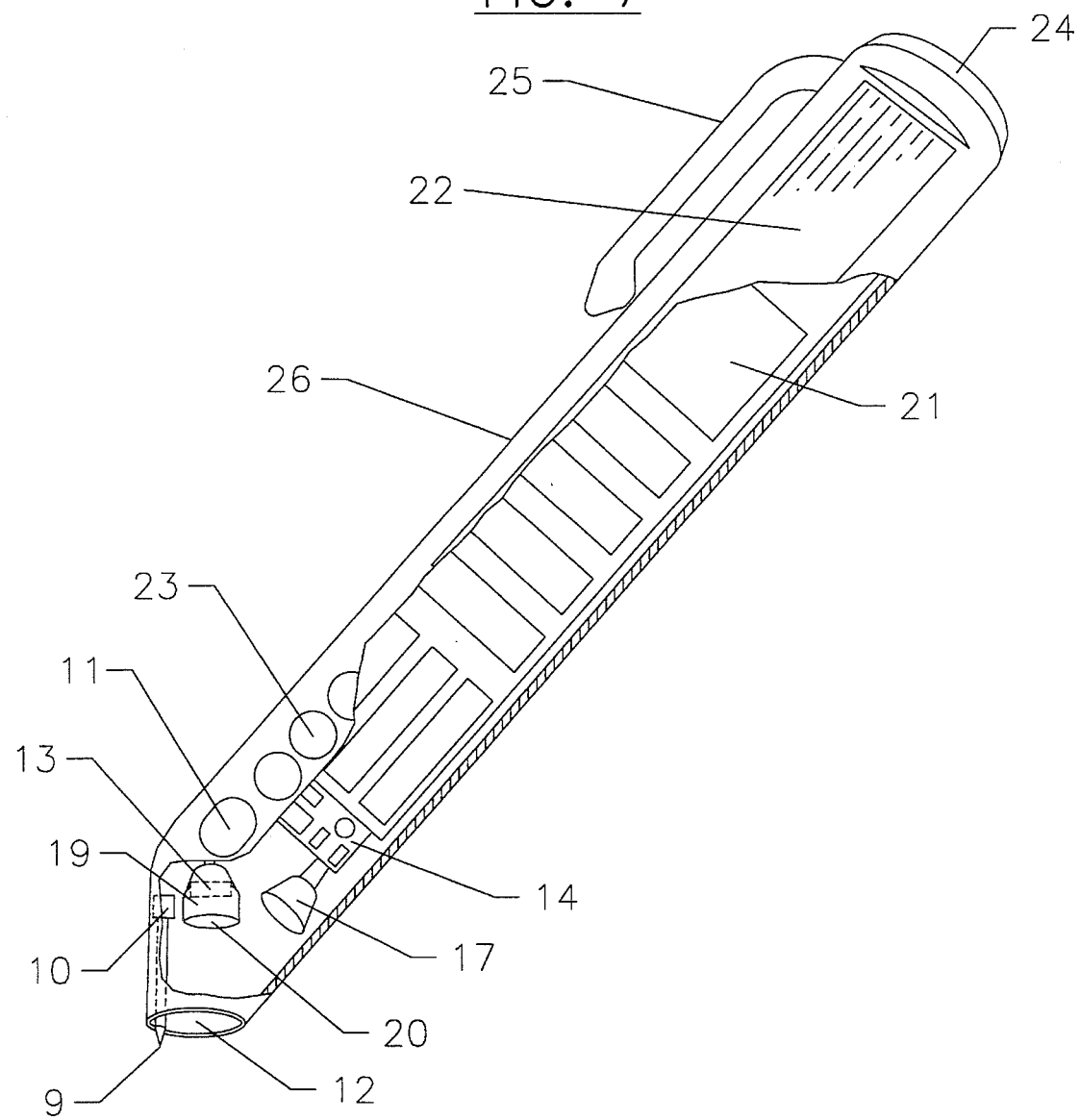

OPTICAL POSITION DETERMINATION

FIELD OF THE INVENTION

This invention relates to apparatus and method for generating computer data from obtaining and outputting the position and/or movement of a moveable element in a data space, in two or three dimensions, such as might be used for determining the position and/or movement of a pen on or over paper.

BACKGROUND—DESCRIPTION OF PRIOR ART

The following United State Patents are believed to be most closely related to the present invention:

| U.S. Pat. Nos.: | | | |
| --- | --- | --- | --- |
| 5,086,197 | 5,075,558 | 5,075,541 | 5,009,277 |
| 4,975,546 | 4,885,433 | 4,853,496 | 4,845,684 |
| 4,809,351 | 4,806,707 | 4,804,949 | 4,751,741 |
| 4,532,376 | 4,364,035 | 4,141,073 | |

Many attempts have been made to determine the position of an object in a data space in the form of computer data. Both two dimensional and three dimensional position determining devices now exist. The use of a writing tablet and a stylus is common for inputting hand written data. Most two dimensional devices require contact between the writing tablet and stylus. Three dimensional devices usually do not require contact. They normally use a form of wave energy such as light, electromagnetic, or sonic.

Generally, two relationships exist between the stylus and the writing tablet. The passive stylus/active tablet utilizes a passive stylus interfacing with an active receiving surface (e.g., resistive and capacitive methods), while the active stylus/passive tablet utilizes an active stylus interfacing with a passive surface (e.g., optical, acoustic, tactile, or electromagnetic). A third method using a mechanical linkage such as a pantograph is rarely used.

The passive stylus/active surface method has some significant shortcomings. The most significant is the active surface or tablet itself. In addition to being complex, large, heavy, cumbersome and difficult to transport, it is expensive. It also cannot distinguish between the stylus and another object pressing on it.

The active stylus/passive surface method also has major drawbacks. Most significantly, this method generally requires an awkward tablet in addition to a separate transmitter and receiver (usually in different locations). Further, the transmitted signal can become obscured before reaching the receiver.

Both the passive stylus/active surface active stylus/passive surface methods have the feeling of being unnatural and require a significant adjustment for the user from the conventional pen and paper. The amount and accuracy of information provided by these methods is limited. In addition, some of these methods require a physical connection between the stylus and the tablet. All the methods provide two dimensional information. Some provide three dimensional information. In addition, they may provide one or more, but not all the following information: displacement, rotation, angle to tablet, and velocity. None provide all the information.

In general, the information is input, analyzed, then output. As part of output, the aforementioned methods can provide a hard copy, but they do not provide an original hard copy as part of input. Since the present invention envisions scanning and writing on a surface with a stylus simultaneously and the coordinate information is obtained by scanning the surface, an original hard copy can be produced simultaneously with input.

OBJECTS AND ADVANTAGES

It is an object of the present invention to provide all of the aforementioned information.

It is an object of the present invention to overcome all of the aforementioned disadvantages.

It is an object of the present invention to provide an apparatus and method for obtaining and outputting the position and/or movement of a moveable element in a data space.

It is an object of the present invention to provide an apparatus and method for obtaining and outputting the position and/or movement of a moveable element in a data space for acquisition and output of hand written data.

It is an object of the present invention to provide a system that most closely resembles using pen and paper.

It is an object of the present invention to provide an original hard copy of data as part of the input process of writing on a surface.

It is an object of the present invention to provide an apparatus and method of the character described in which the position and/or movement of the movable element can be precisely determined relative to a fixed reference.

It is an object of the present invention to provide an apparatus for hand held use.

It is an object of the present invention to provide the aforementioned movable element in the shape of a stylus.

It is an object of the present invention to provide an apparatus of the character described which does not require the use of a special writing tablet.

It is an object of the present invention to provide an apparatus of the character described which does not require the use of a special transmitter.

It is an object of the present invention to provide an apparatus of the character described which can use a surface such as paper formatted with a position-related coding means for indicating X-Y coordinates.

It is an object of the present invention to provide an apparatus of the character described which can use a surface such as paper formatted with a position-related coding means for indicating X-Y coordinates by the stylus at the time of use.

It is an object of the present invention to provide an apparatus and method for obtaining and outputting the position and/or movement of a moveable element in a data space comprising: a surface formatted with a position-related coding means for indicating X-Y coordinates, an optical data input means, a data analysis means, and a data output means.

It is an object of the present invention to provide an apparatus and method for precisely locating the position and/or movement of a movable element within a plane or within a three dimensional space. More particularly, it is an object of the invention to provide an input/output apparatus for use with a computer that includes a movable element, whose exact position and/or movement within a plane or three dimensional space relative to a plane can be determined without any physical connection between the movable element and the plane.

It is an object of the present invention to provide an apparatus and method for handwriting recognition.

It is an object of the present invention to provide an apparatus and method for optical character recognition (OCR).

It is an object of the present invention to provide an apparatus and method for signature verification.

It is an object of the present invention to provide an apparatus and method for handwriting verification.

It is an object of the present invention to provide an apparatus and method for finger print recognition.

It is an object of the present invention to provide an apparatus and method for graphical recognition.

It is an object of the present invention to provide an apparatus and method for converting optically input data into coordinate data.

It is an object of the present invention to provide an apparatus and method for formatting a surface with coordinate data.

It is an object of the present invention to provide an apparatus and method for formatting a surface with coordinate data including (1) imprinting the surface with coordinate codes using ink that reflects only the desired frequency(s) of light, (2) overlaying a surface with a film, template, or plate (i.e. clear film or plate) containing the coordinate code whereby the code reflects the particular frequency of light and/or pattern to be scanned, and (3) formatting the surface by writing on it while scanning, then, using the written data for coordinates.

It is an object of the present invention to provide an apparatus and method for providing analog data.

It is an object of the present invention to provide an apparatus and method for digitizing optical data.

It is an object of the present invention to provide an apparatus and method for learning a data space.

DESCRIPTION OF DRAWINGS

FIG. 1 is an example of a coding means using dots.

FIG. 2 is a example of dots representing coordinates.

FIG. 3 is an example of written text on coded surface of dots.

FIG. 4 is an example of a coding means using barcodes.

FIG. 5 is an example of a coding means using checkerboard-like cubes.

FIG. 7 is a perspective view of an embodiment using a self contained stylus.

Figure 6:
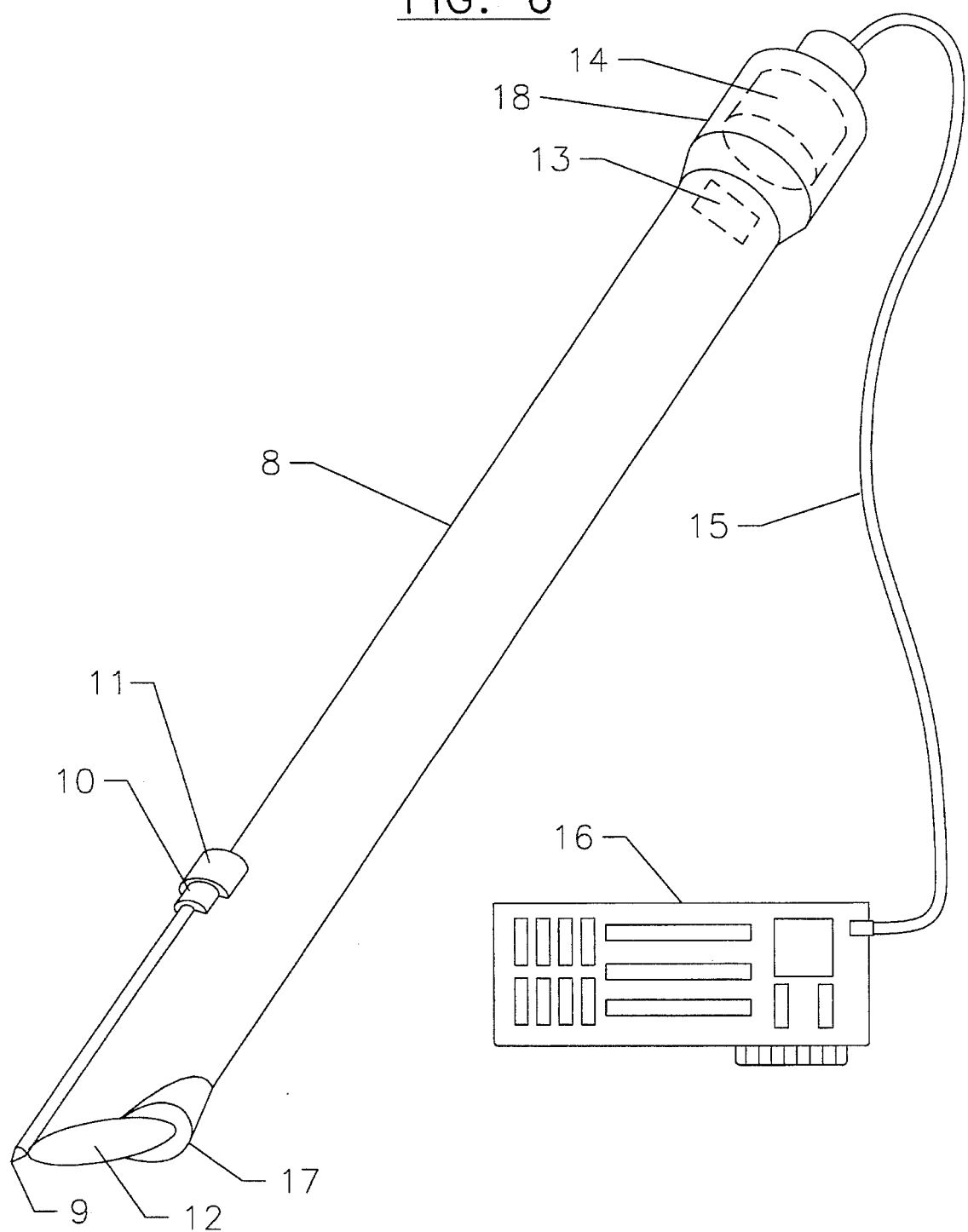
FIG. 6 is a perspective view of an embodiment using an image conduit and a PC board.

| 1  | coded surface   | 2  | dot                  |
|----|-----------------|----|----------------------|
| 3  | quadrant of dot | 4  | center circle        |
| 5  | inner ring      | 6  | outer ring           |
| 7  | ring slices     | 8  | optical conduit      |
| 9  | writing element | 10 | pressure switch      |
| 11 | manual switch   | 12 | lens or light filter |
| 13 | CCD chip        | 14 | electronic interface |
| 15 | cord            | 16 | PC board             |
| 17 | light source    | 18 | protective casing    |

-continued

| 19 | optical element | 20 | lens                |
|----|-----------------|----|---------------------|
| 21 | microcomputer   | 22 | touchscreen display |
| 23 | function keys   | 24 | wireless transceiver|
| 25 | pen clip        |    |                     |

DESCRIPTION OF PREFERRED EMBODIMENTS

The present invention aims to overcome the aforementioned disadvantages and to provide a system that most closely emulates the use of pen and paper.

Accordingly, the present invention proposes the use of a surface (paper) formatted with a position-related coding means for indicating X-Y coordinates capable of reflecting a frequency of light. The stylus (pen) has a light source of a frequency for illuminating the surface. The frequency of light is absorbed by the surrounding surface but reflected by the coding means back into the stylus onto a charge-coupled device (CCD) chip located within the stylus. The information is sent to a computer for processing and finally output to the user. The frequency(s) of light to be used depends on the application. For example, infrared light and light reflecting means can be used for hand writing on paper to be invisible and not interfere with the written text.

One embodiment comprises a surface systematically coded with a plurality of dots 1 in FIG. 1 designating coordinates. Each dot 2 in FIG. 1 is divided into three concentric circles partitioned into quadrants 3 in FIG. 1. The center circle 4 in FIG. 1 forms a small dot, while the other circles form the inner 5 in FIG. 1 and outer 6 in FIG. 1 rings. Each quadrant of each ring represents a digit of a four digit number and is further divided into four equal slices 7 in FIG. 1. The upper right quadrant is the first digit moving clockwise. The outer ring represents the X coordinate and the inner ring represents the Y coordinate. A combination of dark and light slices in the rings of each dot indicates an X-Y coordinate FIG. 2. The use of the center dot for additional data is optional.

Writing FIG. 3 on the surface causes coordinates to be scanned, input, analyzed, and output. Thus, the path of the stylus and, more particularly, the writing tip is determined.

Alternatively, the position-related coding means is comprised of any means for indicating coordinates. For example, a barcode system FIG. 4 or a system of checkerboard-like cubes FIG. 5 can be used.

As well, the means for formatting can be comprised of any means for imposing coordinates onto a surface, including (1) imprinting the surface with coordinate codes using ink that reflects only the desired frequency(s) of light, (2) overlaying a surface with a film, template, or plate (i.e. clear film or plate) containing the coordinate code whereby the code reflects the particular frequency of light and/or pattern to be scanned, and (3) formatting the surface by writing on it while scanning, then, using the written data for coordinates.

The stylus is composed of a pen shaped optical conduit 8 in FIG. 6. At the lower scanning end is a replaceable and/or retractable writing element 9 in FIG. 6 connected to a pressure sensitive on/off switch 10 in FIG. 6. A manual override on/off switch 11 in FIG. 6 is provided. The scanning end is angled at 45 degrees away from the writing element to be generally level with the surface and is optically formed to read close to the surface. Optionally, the scanning end comprises a lens, lens shade, and/or light filter 12 in FIG. 6. The upper end of the stylus comprises a CCD chip 13 in FIG. 6 facing down toward the writing tip. Connected to the CCD chip is an electronic interface 14 in FIG. 6 to interface the CCD chip to the cord 15 in FIG. 6. The cord in turn is connected to a PC board 16 in FIG. 6 placed inside a personal computer. The light source 17 in FIG. 6 is optionally placed at the upper or lower end of the stylus. Wires connect the electronic components. The upper end of the stylus is enclosed with a protective casing 18 in FIG. 6.

A second embodiment comprises the aforementioned surface and a self contained pen shaped stylus. The stylus includes a replaceable and retractable writing element 9 in FIG. 7 at the lower end connected to a pressure sensitive on/off switch 10 in FIG. 7. A manual override on/off switch 11 in FIG. 7 is provided. The scanning end is open and angled at 45 degrees away from the writing element to be generally level with the surface. Inside the stylus above the opening is the optical element 19 in FIG. 7, optically formed to read close to the surface. Located at the bottom of the optical element is a lens, lens shade, and/or light filter 20 in FIG. 7. Optionally, the scanning end comprises an interchangeable lens, lens shade, and/or light filter 12 in FIG. 7. The CCD chip 13 in FIG. 7 is located within the optical element. A microcomputer 21 in FIG. 7 is located within the stylus. An electronic interface 14 in FIG. 7 interfaces the CCD chip and other components to the microcomputer. The light source 17 in FIG. 7 is placed at the lower end in the stylus near the optical element. Wires connect the various electronic components. From the lower mid-body to the upper end is a touchscreen display 22 in FIG. 7. Function keys 23 in FIG. 7 are located near the lower end of the stylus below the touchscreen. On the upper end is a wireless transceiver 24 in FIG. 7 for communicating with other devices. Optionally, a pen clip 25 in FIG. 7 is located near the upper end.

During the process of writing, the surface is scanned of coordinates whereby the light is reflected from the surface, and onto the CCD chip. Data from the CCD chip is sent to the computer for analysis, and finally output onto a screen.

I claim:

1. A coordinate sensor comprising:

a data space formatted with at least one coding means for designating coordinates of at least one point in said data space;

a detector means for detecting said at least one coding means and for generating at least one output signal thereof;

a processing means for receiving and processing said at least one output signal from said detector means, thereby to determine the position of said detector means relative to said at least one point;

said data space comprises a writing surface;

said at least one coding means comprises an optical image;

said detector means comprises an array of light sensitive elements;

said processing means comprises a computer.

2. A coordinate sensor according to claim 1, whereby:

said data space comprises a substantially planar face;

said at least one coding means comprises coordinates for two dimensions for at least one point in said data space;

said detector means comprises an array of light sensitive elements grouped together in two dimensions;

said at least one coding means being detectable by said detector means.

3. A coordinate sensor according to claim 1, whereby:

said data space comprises at least one dimension;

said at least one coding means comprises coordinates for at least one dimension;

said detector means comprises an array of light sensitive elements grouped together in at least one dimension.

4. A coordinate sensor according to claim 1 comprising a human interface means for interface of said coordinate sensor with a human.

5. A coordinate sensor according to claim 1, whereby said at least one coding means comprises means selected from the group consisting of a transmissive coding means and a reflective coding means.

6. A coordinate sensor according to claim 1, comprising a body member selected from the group consisting of a pen/pencil-shaped body member, a body member suitable for hand held use, and a body member.

7. A coordinate sensor according to claim 1, whereby said at least one coding means comprises an overlay means for overlaying said data space which is selected from the group consisting of a film, template, or plate (i.e. clear film or plate) containing said at least one coding means.

8. A coordinate sensor according to claim 1 further comprises an inscribing means for inscribing said writing surface.

9. A coordinate sensor according to claim 1, whereby said detector means comprises a selective detector means for selectively detecting said at least one coding means.

10. A coordinate sensor comprising:

a data space formatted with at least one coding means for designating coordinates of at least one point in said data space;

a detector means for detecting said at least one coding means and for generating at least one output signal thereof;

a processing means for receiving and processing said at least one output signal from said detector means, thereby to determine the position of said detector means relative to said at least one point;

said data space comprises a writing surface;

an inscribing means for inscribing said writing surface.

11. A coordinate sensor according to claim 10, whereby:

said data space comprises a substantially planar face;

said at least one coding means comprises coordinates for two dimensions for at least one point in said data space;

said detector means comprises an array of light sensitive elements grouped together in two dimensions;

said at least one coding means being detectable by said detector means.

12. A coordinate sensor according to claim 10, whereby:

said data space comprises at least one dimension;

said at least one coding means comprises coordinates for at least one dimension;

said detector means comprises an array of light sensitive elements grouped together in at least one dimension.

13. A coordinate sensor according to claim 10, whereby:

said data space comprises a writing surface;

said at least one coding means comprises an optical image;

said detector means comprises an array of light sensitive elements;

said processing means comprises a computer.

14. A coordinate sensor according to claim 10 comprising a human interface means for interface of said coordinate sensor with a human.

15. A coordinate sensor according to claim 10, whereby said at least one coding means comprises means selected from the group consisting of a transmissive coding means and a reflective coding means.

16. A coordinate sensor according to claim 10, comprising a body member selected from the group consisting of a pen/pencil-shaped body member, a body member suitable for hand held use, and a body member.

17. A coordinate sensor according to claim 10, whereby said at least one coding means comprises an overlay means for overlaying said data space which is selected from the group consisting of a film, template, or plate (i.e. clear film or plate) containing said at least one coding means.

18. A coordinate sensor according to claim 10, whereby said detector means comprises a selective detector means for selectively detecting said at least one coding means.

\* \* \* \* \*